US008681740B2

(12) United States Patent
Bovo et al.

(10) Patent No.: US 8,681,740 B2
(45) Date of Patent: Mar. 25, 2014

(54) LTE NETWORK CALL CORRELATION DURING USER EQUIPMENT MOBILITY

(75) Inventors: Antonio Bovo, Padua (IT); Vignesh Janakiraman, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 436 days.

(21) Appl. No.: 12/974,762

(22) Filed: Dec. 21, 2010

(65) Prior Publication Data

US 2012/0155428 A1 Jun. 21, 2012

(51) Int. Cl.
*H04W 12/04* (2009.01)
*H04W 12/00* (2009.01)
*H04W 12/02* (2009.01)
*H04W 12/06* (2009.01)
*H04W 12/08* (2009.01)
*H04W 12/10* (2009.01)
*H04W 8/00* (2009.01)

(52) U.S. Cl.
CPC .............. *H04W 12/00* (2013.01); *H04W 12/02* (2013.01); *H04W 12/04* (2013.01); *H04W 12/06* (2013.01); *H04W 12/08* (2013.01); *H04W 12/10* (2013.01); *H04W 8/00* (2013.01)
USPC ........................................................ 370/331

(58) Field of Classification Search
CPC ........... H04W 8/00; H04W 8/02; H04W 8/04; H04W 8/065; H04W 8/08; H04W 8/10; H04W 8/12; H04W 8/14; H04W 8/16; H04W 8/22; H04W 8/24; H04W 8/245; H04W 12/00; H04W 12/02; H04W 12/04; H04W 12/06; H04W 12/08; H04W 12/10; H04W 36/00; H04W 36/0033; H04W 36/0038; H04W 36/0077; H04L 12/56
USPC ........................................................ 370/331
See application file for complete search history.

(56) References Cited

U.S. PATENT DOCUMENTS 7,360,086 B1 * 4/2008 Tsuchiya et al. ............... 713/168
2007/0171871 A1 * 7/2007 Forsberg ........................ 370/331
(Continued)

FOREIGN PATENT DOCUMENTS

EP    2 219 323 A1      8/2010
EP    2219323 A1  *    8/2010
EP    2293610 A1  *    3/2011

OTHER PUBLICATIONS

"Digital cellular telecommunications system ;System (UMTS); LTE; 3GPP System Architecture Evolution (SAE); Security architecture (3GPP TS 33.401 version 9.5.0 Release 9)",Technical Specification, European Telecommunications Standards Institute (ETSI), 650, Route Des Lucioles ; France, vol. 3GPP SA 3. No. V9.5.0, Oct. 1, 2010 , XP014061683.*

(Continued)

*Primary Examiner* — Melvin Marcelo
*Assistant Examiner* — Ellen A Kirillova
(74) *Attorney, Agent, or Firm* — Edwards Wildman Palmer LLP; Scott D. Wofsy; George N. Chaclas

(57) ABSTRACT

A network monitoring system captures data packet from LTE/SAE network interfaces using passive probes. The monitoring system identifies context data associated with a first user on an S1-MME interface. Next hop parameters, such as a Next Hop Key and/or a Next Hop Chaining Counter, are derived for the first user equipment. The monitoring system creates a first context entry for the first user comprising of the next hop parameters. The monitoring system also identifies second context data associated with a second user on a second S1-MME interface. Next hop parameters are also identified for the second context data. The second context next hop parameters are compared to the first context next hop parameters. If they match, it is possible to track the user even in case of mobility, binding its activity on the two legs and retrieving the security parameters to be used for deciphering.

20 Claims, 4 Drawing Sheets

(56) References Cited

U.S. PATENT DOCUMENTS

| | | | |
|---|---|---|---|
| 2008/0167003 A1* | 7/2008 | Wang et al. | 455/411 |
| 2009/0097406 A1* | 4/2009 | Nilakantan et al. | 370/235 |
| 2011/0051691 A1* | 3/2011 | Hietalahti et al. | 370/331 |
| 2011/0269465 A1* | 11/2011 | Xu et al. | 455/436 |
| 2012/0039468 A1* | 2/2012 | Ishida et al. | 380/247 |
| 2012/0082315 A1* | 4/2012 | Bai et al. | 380/272 |
| 2012/0307732 A1* | 12/2012 | Olsson et al. | 370/328 |

OTHER PUBLICATIONS

3GPP, "Universal Mobile Telecommunications System (UMTS); LTE; 3G security; Security architecture," 3GPP TS 33.102, version 9.3.0 Release 9, Oct. 2010.

3GPP, "Digital cellular telecommunications system (Phase 2+); Universal Mobile Telecommunications System (UMTS); LTE; 3GPP System Architecture Evolution (SAE); Security architecture," 3GPP TS 33.401, version 9.5.0 Release 9, Oct. 2010.

European Patent Office, "Extended European Search Report," EPO Application No. 11194008.6-2413, May 9, 2012, (8 pages).

ETSI, "Digital cellular telecommunications system (Phase 2+); Universal Mobile Telecommunications System (UMTS); LTE; 3GPP System Architecture Evolution (SAE); Security architecture (3GPP TS 33.401 version 9.5.0 Release 9)," Technical Specification, European Telecommunications Standards Institute (ETSI), 650, route des Lucioles ; F-06921 Sophia-Antipolis ; France (cited in EPO Search Report).

ETSI, "LTE; Evolved Universal Terrestrial Radio Access Network (E-UTRAN); S1 Application Protocol (S1AP) (3GPP TS 36.413 version 9.4.0 Release 9)," Technical Specification, European Telecommunications Standards Institute (ETSI), 650, route des Lucioles ; F-06921 Sophia-Antipolis ; France (cited in EPO Search Report).

* cited by examiner

LTE NETWORK CALL CORRELATION DURING USER EQUIPMENT MOBILITY

TECHNICAL FIELD

Embodiments are directed, in general, to monitoring data packets on an LTE network and, more specifically, to deciphering captured data packets during user equipment handover.

BACKGROUND

In a Long Term Evolution (LTE) network, User Equipment (UE) communicates with enhanced Node B (eNodeB) network entities. The eNodeBs are controlled by Mobility Management Entities (MME). When a UE attaches to the LTE network, the UE and associated MME undergo an Authentication and Key Agreement (AKA) process, which authenticates the UE and network to each other. The AKA process also generates keys for ciphering traffic between the UE and the network. When the AKA process is complete, most of the message traffic exchanged between the UE and the network is ciphered before transmission. The ciphered traffic cannot be read unless the receiving party has the key that the sending party used to cipher the messages.

Additional problems arise when UE handover occurs between eNodeBs. The keys needed to decipher messages for a UE attached to a first eNodeB can be used when the UE is handed over to another eNodeB. However, when S1-based or X2-based handover occur, network monitoring equipment will unlikely see a new AKA procedure for the UE handover. Accordingly, monitoring system must identify the proper security context for the handed over UE to decipher traffic through the new eNodeB. The algorithms available on 3G networks for correlation of keys for monitoring purposes cannot be used on LTE/SAE networks due to differences in technology. The LTE network structure is completely different from 3G networks, including different interfaces and different type of data. Accordingly, algorithms already in place for other networks cannot be used in solving the problem of tracking keys for use in handover.

SUMMARY

Network operators may monitor an LTE network using monitoring equipment that captures and analyzes Packet Data Units (PDUs) from network interfaces. These PDUs may be correlated to create session records on a per user basis. However, the PDUs cannot be easily correlated if they are ciphered. The monitoring equipment must have the correct keys to decipher the PDUs. A UE attaches to the network and establishes cipher keys with the network. The monitoring system must capture the cipher keys or the information used to generate the cipher keys when the UE attaches, or it will be unable to decipher messages associated with the UE.

For UE mobility in which a UE is handed over from one eNodeB to another, an MME has the cipher keys for the UE and knows which eNodeB will be the target of the handover. A network monitoring system can obtain initially the keys required to decipher the traffic from the AKA procedure on S1-MME interface towards the source eNodeB. However, during a handover, the MME will send a handover request message to the target eNodeB, but this message does not specifically identify the UE or provide an obvious mechanism to link the call legs among different eNodeBs. The monitoring system can observe that a handover has occurred, but cannot determine which UE is involved. After handover, the UE will use the existing security context to communicate with the new eNodeB. When the UE attaches to the target eNodeB, typically it will not initiate a new AKA procedure, so the monitoring equipment will not be able to capture the keys needed to decipher the traffic after handover.

In order to link the call legs from before and after the handover, the monitoring equipment can use the Next Hop (NH) key parameter that is sent in the handover request message. This key has the role of "forward security" in the network and it is derived by the MME with a chaining derivation, starting from the $K_{ASME}$ and $K_{eNb}$ keys. The monitoring equipment has the $K_{ASME}$ (Key Access Security Management Entries) and $K_{eNB}$ (eNodeB Key) for the UE prior to handover. Using these keys, it can calculate the Next Hop Chaining Counter (NCC) and NH values as well. The monitoring system can store the NH and NCC values and will use them to link the call legs together for different eNodeBs.

BRIEF DESCRIPTION OF THE DRAWINGS

Figure 1:
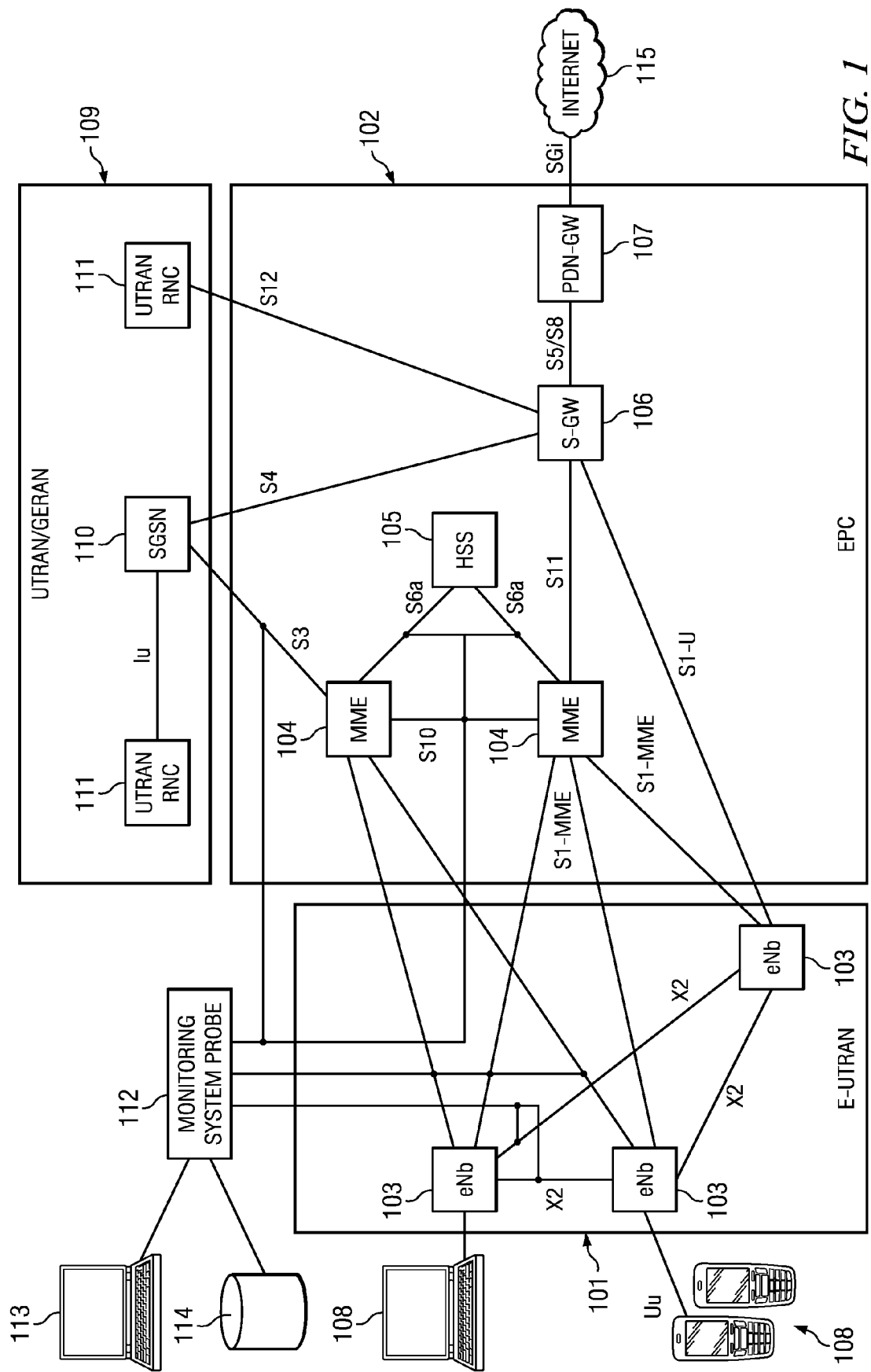
Figure 2:
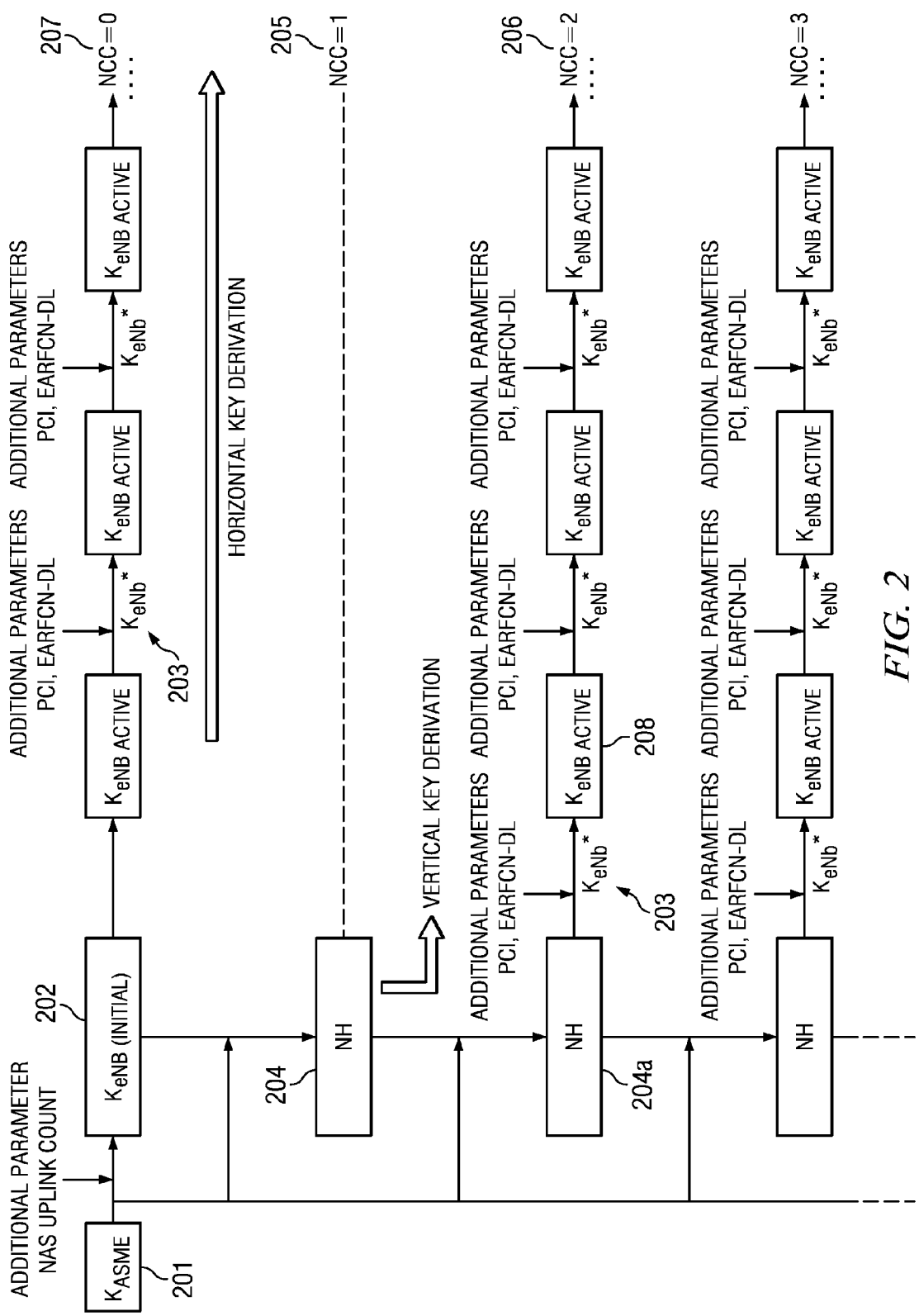
Figure 3:
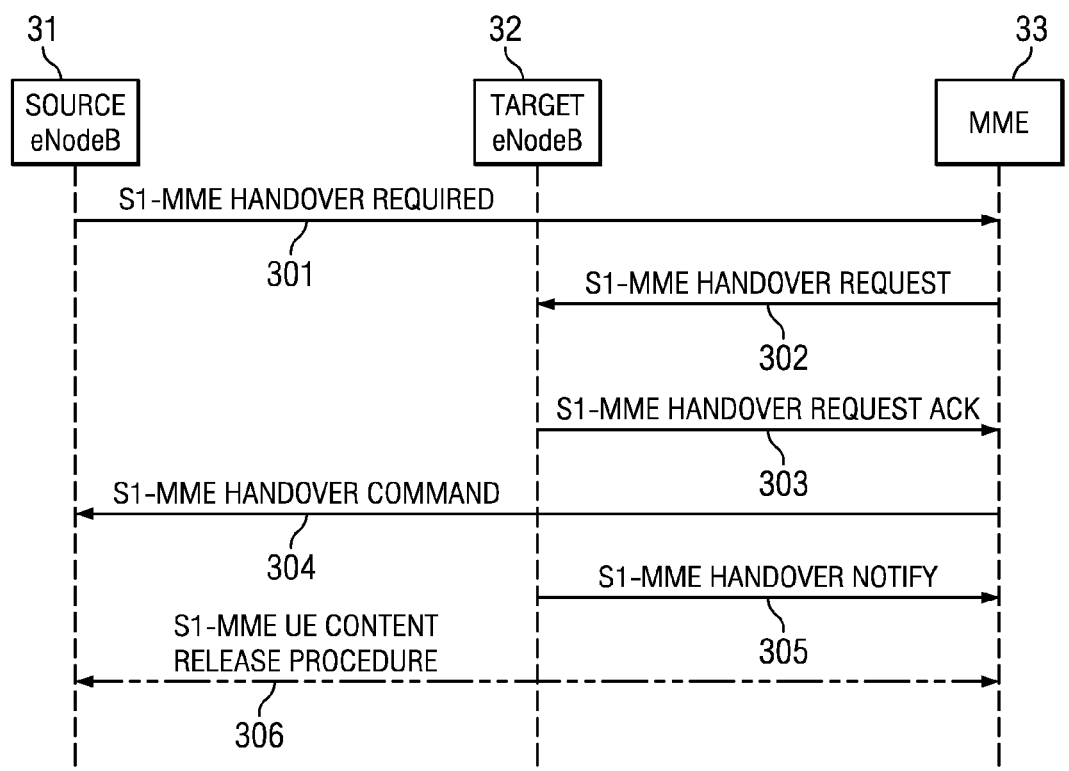
Figure 5:
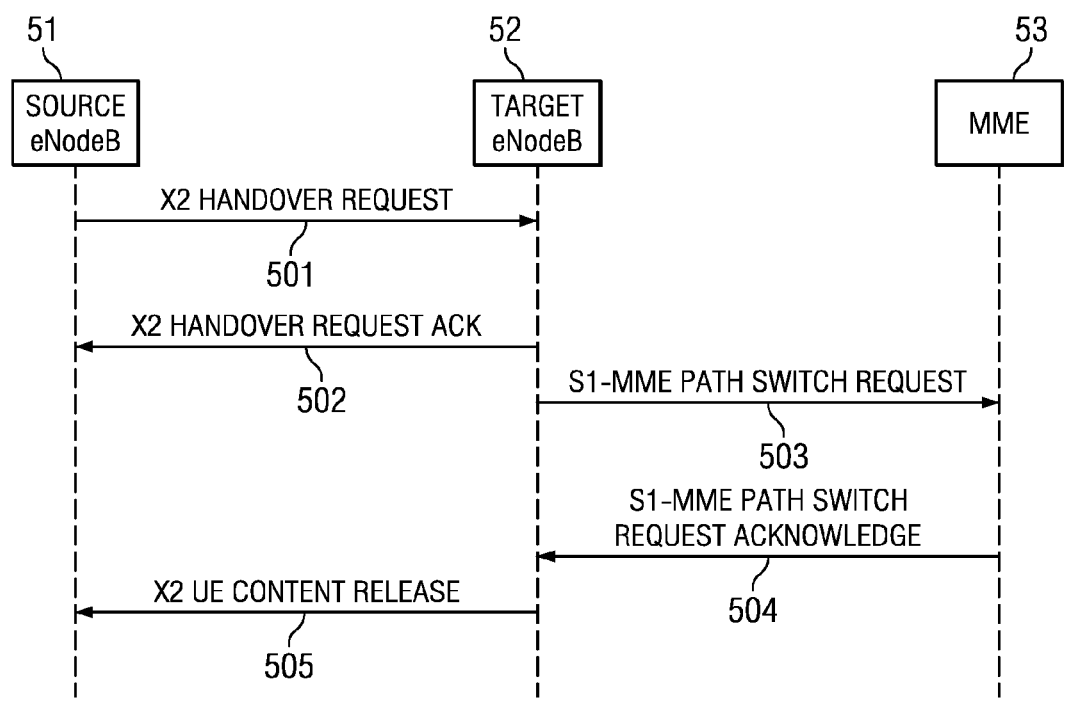
Figure 4:
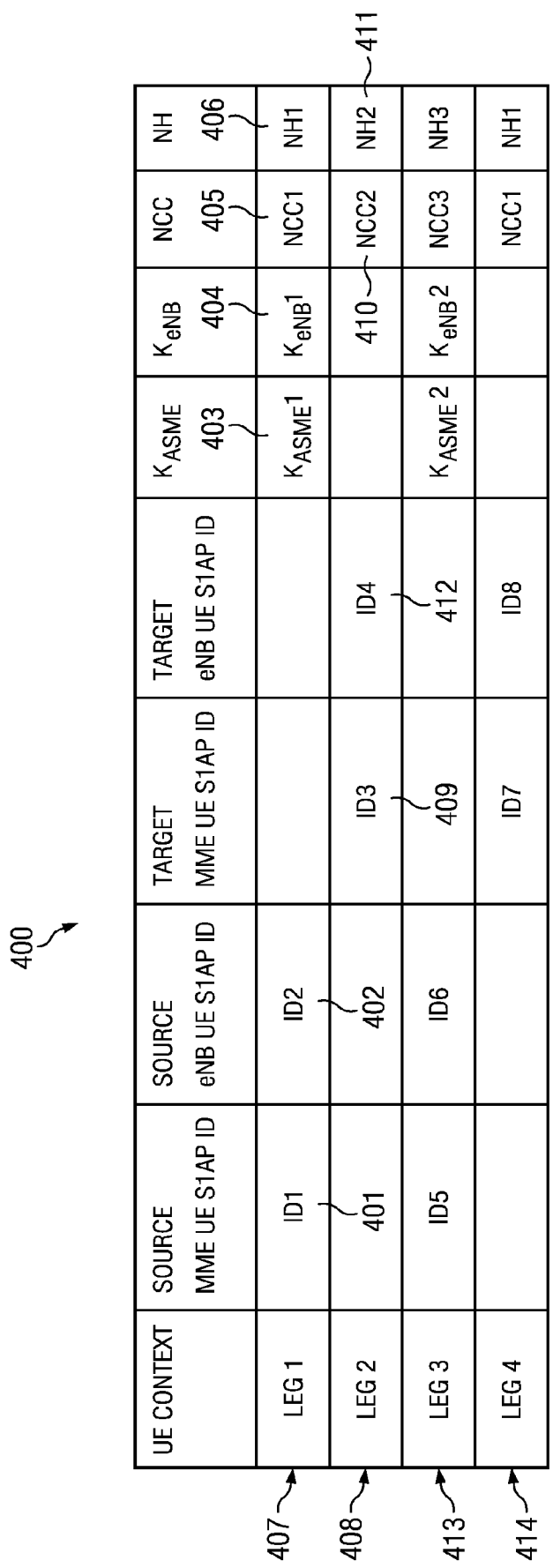

Having thus described the invention in general terms, reference will now be made to the accompanying drawings, wherein:

FIG. 1 is a block diagram illustrating the LTE (Long Term Evolution) and SAE (System Architecture Evolution) network architecture;

FIG. 2 illustrates the Next Hop (NH) key derivation mechanism;

FIG. 3 illustrates intra-MME mobility wherein a UE is handed over from source eNodeB to target eNodeB using S1-based signaling to the same MME;

FIG. 4 illustrates a context tracking table that includes UE context information for a number of current security contexts detected by the monitoring system; and FIG. 5 illustrates the messages that are exchanged on the X2 and S1 interfaces for X2-based handover.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating the LTE (Long Term Evolution)/SAE (System Architecture Evolution) network architecture. The LTE/SAE network technology represents mobile network evolution to provide high-rate IP-based services. The standardization entity in charge of specifying the mobile standards, which is known as the $3^{rd}$ Generation Partnership Project (3GPP), has defined standards for mobile telecommunication systems, including both the radio access and the core network evolution. The standard is named Evolved Packet System (EPS), and it specifies the evolution of the UTRAN access network—the evolved UTRAN (eUTRAN) 101—and the concurrent evolution of the Core network—the Evolved Packet Core (EPC) 102. LTE and SAE are commonly used synonyms for eUTRAN 101 and EPC 102, respectively.

The network comprises a number of different types of network nodes and interfaces. The nodes include, for example, an enhanced NodeB (eNodeB or eNb) 103, Mobility Management Entity (MME) 104, Home Subscriber Service (HSS) 105, Serving Gateway (S-GW) 106, and Packet Data Network Gateway (PDN-GW) 107. The interfaces between the nodes in the EPC domain are generally named "S#." The "X2" interface (between eNodeBs) and "Uu" interface (air interface between eNodeBs 103 and User Equipment 108) are in the eUTRAN domain.

The goal of the EPS technology is to significantly enhance the bandwidth available to users and, at the same time, improve the Quality of Service (QoS) of the radio connection.

The following nodes operate within the eUTRAN domain. User Equipment (UE) 108 is the subscriber endpoint of the end-to-end services. UE 108 communicates over the Uu interface to eNodeBs 103 on the radio path. eNodeB (103) manages the radio path to UE 108 and hosts the physical radio establishment, radio link control, and medium access control functions. eNodeB 103 also encrypts and decrypts data toward the radio path and handles the radio resource admission and management.

The following nodes operate within the EPC domain. MME 104 is the node responsible for managing the non access stratum (NAS) control plane messages from/to the UE 108. In addition, MME 104 plays a role in selecting S-GW 106 for user plane traffic, coordinates handover in LTE/SAE, and establishes the necessary connections to HSS 105 for authentication and security procedures. MME 104 also coordinates the bearer assignment to the UE 108. HSS 105 has a role similar to the 3G HLR (Home Location Register). HSS 105 maintains subscriber profile and subscription data, subscriber identifiers (e.g. International Mobile Subscriber Identity (IMSI) and Mobile Subscriber Integrated Services Digital Network Number (MSISDN)), and subscriber authentication and security data. HSS 105 is the endpoint for UE 108 location updating procedures coming from MME 104. S-GW 106 is the endpoint of user plane connections from eNodeB nodes 103. S-GW 106 is an anchor for user plane connections in case of UE handover between eNodeBs 103. PDN-GW (107) is the network node that provides an interface between the EPC with external PDN networks, such as the Internet 115.

The LTE/SAE network often interfaces with nodes from existing 3G networks, such UTRAN (Universal Terrestrial Radio Access Network) and GERAN (GSM EDGE Radio Access Network) networks 109. Serving GPRS Support Node (SGSN) 110 plays a role in S-GW or MME selection and coordinates with MME 104 for handover coordination in the case of inter-RAT (radio access technologies) handovers between UTRAN/GERAN 109 and eUTRAN 101. Radio Network Controller (RNC) 111 also provides an interface to the 3G UTRAN network 109. In case of handovers to/from UTRAN 109 and "direct tunneling" architecture, RNC 111 may be the endpoint of data connections to/from S-GW 106.

In a complex system such as an LTE/SAE network, the tasks of measuring network performance, troubleshooting network operation, and controlling network service behavior can be very difficult for the network operator. Evolution of the network, such as the introduction and deployment of new network technology, causes additional instability and further problems in network measurement, troubleshooting and control. In order to perform these tasks, network operators often make use of external monitoring systems. These monitoring systems are typically connected to the network in a non-intrusive mode that allows them to sniff data from the network interfaces, processing the data and provide measurements and reports that help the network operator to manage its network. The monitoring system typically needs to track the UEs' activities in order to provide detailed analysis of the services used by the subscribers and to collect information about the network's behavior for troubleshooting and optimization purposes.

A monitoring system 112 may be coupled to links in the LTE/SAE network to passively monitor and collect signaling data from one or more interfaces in the network. Monitoring system 112 may collect user plane and control plane data from the EPC and eUTRAN interfaces, including, for example, the S1-MME, S6a, S10, and S11 interfaces that have an MME 104 as an endpoint and S1-MME and X2 interfaces that have an eNodeB 103 as an endpoint. It will be understood that some or all of the other interfaces or links in the network may also be monitored by monitoring system 112. The monitoring system 112 may comprise, in one embodiment, one or more processors running one or more software applications that collect, correlate and analyze Protocol Data Units (PDU) and data packets from eUTRAN 101 and EPC 102.

Monitoring system 112 may incorporate protocol analyzer, session analyzer, and/or traffic analyzer functionality that provides OSI (Open Systems Interconnection) layer 2 to layer 7 troubleshooting by characterizing IP traffic by links, nodes, applications and servers on the network. Such functionality is provided, for example, by the GeoProbe G10 platform, including the Iris Analyzer Toolset applications and SpIprobes, from Tektronix Incorporated. Although a single monitoring system probe is illustrated in FIG. 1, it will be understood that this is for the sake of simplification and that any number of interconnected monitoring system probes may be coupled to one or more interfaces within the LTE/SAE network. A single monitoring probe may capture data from a particular interface, or two or more probes may be coupled to one interface.

Monitoring system 112 may be coupled to network interfaces via packet capture devices, such as high-speed, high-density probes that are optimized to handle high bandwidth IP traffic. Monitoring system 112 passively captures message traffic from the interfaces without interrupting the network's operation. A service provider or network operator may access data from monitoring system 112 via user interface station 113. Monitoring system 112 may further comprise internal or external memory 114 for storing captured data packets, user session data, call records configuration information, and software application instructions. Monitoring system 112 may capture and correlate the packets associated specific data sessions on network interfaces. In one embodiment, related packets can be correlated using a 5-tuple association mechanism. The 5-tuple association process uses an IP correlation key that consists of 5 parts—server IP address, client IP address, source port, destination port, and Layer 4 Protocol (TCP or UDP or SCTP). The related packets can be combined into a record for a particular flow, session or call on the network.

In an alternative embodiment, monitoring system 112 may be an active component, such as a software agent, that resides on an EPC node, such as on MME 104, for example, and that captures data packets passing into or out of the node.

One of the basic issues in monitoring mobile networks is tracking user activity during mobility. Specifically, in LTE/SAE networks, there is the need to follow two different handover cases. First, monitoring system must detect S1-based handover, wherein the UE moves from a source eNodeB to a target eNodeB with the coordination of the MME. Second, the monitoring system must detect X2-based handover, wherein mobility is performed directly by an eNodeB pair (source and target nodes) that only inform the MME about the successful completion of the handover procedure.

The NAS traffic between an UE and an MME is typically ciphered using specific security keys and security material. Being able to correlate the correct security key and material during a handover is not a trivial task, due to the nature of non-intrusive monitoring system 112 placed as a "man-in-the-middle" sniffing the traffic. Embodiments of the monitoring system 112 correlate and retrieve the correct security material in case of either S1-based or X2-based handover. This correlation allows the monitoring system to properly bind the source and target path of the connection during specific handover scenarios. For example, the monitoring system will generate a first call record for a particular UE when it attaches to a first eNodeB (first leg). If the UE is then handed-over to a new eNodeB, the monitoring system must identify the new call record for the UE on the second new eNodeB and combine the new call record (second leg) with the first call record. This can be difficult because the traffic on the first and second legs is ciphered, and the monitoring system must determine what keys to use to decipher the traffic on the second leg without the benefit of capturing the keys in a new AKA procedure.

The monitoring system disclosed herein allows tracking of the security keys to be applied either on Non Access Stratum (NAS) or Packet Data Convergence Protocol (PDCP), by means of monitoring the S1-MME interfaces (between the eNodeBs and the MMES) and the S6a interfaces (between the MME and the HSS). In other words, only the S1-MME and S6a interfaces need to be monitored in order to correlate the security keys in S1-based and X2-based handover. So, monitoring the S10, S3 or X2 interfaces is not mandatory for this function, which simplifies the deployment of the monitoring probes but still allows the call correlation functionality during UE mobility.

A basic principle involved in the monitoring of handover UEs is the pre-calculation of a security key identified as the Next Hop (NH) key at the source side (first leg) of the handover. The NH key is calculated using the $K_{eNB}$ key and is correlated with the target side (second leg) of the handover when NH is seen on the target side. The monitoring system is also capable of tracking UE in the scenario known as "Handover Chaining" wherein the target side does a second handover to another eNodeB and so on.

The general concepts of LTE security and specifically NAS security, such as native or mapped security contexts, are known to those of ordinary skill in the art. For example, the security architecture, including the security features and the security mechanisms, and the security procedures performed within the EPC and the eUTRAN are set forth in Technical Specifications produced by the 3rd Generation Partnership Project (3GPP). One Technical Specification of interest is designated "Digital cellular telecommunications system (Phase 2+); Universal Mobile Telecommunications System (UMTS); LTE; 3GPP System Architecture Evolution (SAE); Security architecture (3GPP TS 33.401 version 9.5.0 Release 9)" dated October 2010 (hereinafter "TS 33.401"), which is incorporated herein by reference in its entirety.

FIG. 2 illustrates the Next Hop (NH) key derivation mechanism. The MME derives a $K_{eNB}$ key from the basic $K_{ASME}$ key 201. The $K_{eNB}$ key is then used for security of CP/UP on Uu interface. The algorithm to derive the $K_{eNB}$ is described in TS 33.401 at Annex A.1 and A.3. The NH key 204 is obtained from either the $K_{eNB}$ or from a previously derived NH key (e.g. 204a) in a chaining derivation as described in Annex A.4 of TS 33.401. The NH key 204 is used to assure "forward security." As a result, an eNodeB cannot predict the key that will be used by another eNodeB after a UE handover. When there is a handover, the $K_{eNB}$* 203 key that is used between the UE and new eNodeB can be obtained either by the current $K_{eNB}$ or by the NH key 204a.

As illustrated in FIG. 2, the $K_{eNB\ (initial)}$ key 202 is derived from $K_{ASME}$ 201. Subsequent $K_{eNB}$* keys 203 can be derived from the previous $K_{eNB}$. This is called "horizontal key derivation" and is used during intra eNodeB handover. The NH key 204 is derived from the $K_{ASME}$ key 201 and the $K_{eNB\ (initial)}$ 202 at the first stage with an associated Next Hop Chaining Counter (NCC) value=1 (205). In subsequent iterations, the NH key 204a is derived again from the $K_{ASME}$ key 201 and the previous available NH key 204. Each NH key has an associated NCC value 206.

The NCC (Next Hop Chaining Counter) value=0 (207) corresponds to a "virtual" NH key associated to the $K_{eNB\ initial}$ key 202. When a $K_{eNB\ active}$ key 208 is derived from a NH value 204a, the process is called "vertical key derivation." The $K_{eNB}$* key derivation from a NH value can be done from NCC=2 or greater. So the NH 204 for NCC=1 (205) is never used for $K_{eNB}$ derivation. This "vertical key derivation" process is used by the monitoring system to link the different call legs during inter eNodeB handovers (S1-based or X2-based handover).

The NH key can be calculated as: (as described in Annex A.4 of TS 33.401)

$$NH=HMAC\text{-}SHA\text{-}256(K_{ASME},S)$$

where HMAC-SHA-256 is a keyed-hash message authentication code algorithm, the $K_{ASME}$ key is 256 bits long, and the S parameter is a bit string defined as:

$$S=FC\|PO\|LO$$

and where:
  FC=0x12;
  PO=SYNCH-input, that is either the $K_{eNB}$ or the previously derived NH key, depending on the NCC value;
  LO=length of SYNCH-input (i.e. 0x00 0x20); and
  ∥=bit concatenation operator.

FIG. 3 illustrates intra-MME mobility wherein a UE is handed over from source eNodeB 31 to target eNodeB 32 using S1-based signaling to the same MME 33. Source eNodeB 31 decides to trigger an S1-based handover when, for example there is no X2 interface between the source and target eNodeBs 31, 32. Source eNodeB 31 sends a Handover Required message (301) over the S1-MME interface.

Prior to the handover procedure illustrated in FIG. 3, the UE (not shown) has been attached to source eNodeB 31. Traffic between the UE and MME 33 via eNodeB 31 is ciphered using keys obtained during an Authentication and Key Agreement (AKA) procedure. The network monitoring system obtains the $K_{ASME}$ that is associated with the UE from the AKA procedure. The monitoring system also obtains the $K_{eNB}$ key that is associated with the UE from S1-AP Initial Context Setup request or S1-AP UE Context modification procedures. Once the $K_{eNB}$ key is obtained, the monitoring system pre-computes the NH for NCC=2 and indexes all Security Context information for the UE using the NH value. The monitoring system maintains a repository of UE contexts that have been used in the network. The UE context repository stores the $K_{ASME}$, NCC and NH parameters for each UE context used.

MME 33 exchanges Handover Request (302) and Handover Request Ack (303) messages with target eNodeB 32 to provide the new eNodeB with the UE's security context information. The Handover Request message (302) includes security context parameters that include security related information, such as the NCC and NH values. The NCC and NH values are used by the monitoring system to query the UE context repository to get the $K_{ASME}$ that has been used by the UE. Hence the NH key is used by the monitoring system to bind the Source and the Target S1-MME paths (first and second legs) during the S1 handover.

The target eNodeB may decide to handover the UE to another (third) eNodeB. The monitoring system can link together multiple legs for such handover chaining. The monitoring system pre-computes the next NH value corresponding to the next NCC that will be used for the security context and then indexes the security context using the new NH value. When the target side eNodeB decides to handover the UE to another eNodeB, the new NH value will be detected in the new (third) eNodeB Handover Request message and can be used to link the legs among the different eNodeBs. This process can then continue when there is a subsequent handover to the fourth, fifth eNodeBs and so on.

Table 1 lists messages that are used to establish a security context for a UE and for handover of the UE.

TABLE 1

| MESSAGE | PARAMETERS USED FOR KEY TRACKING | NOTE |
|---|---|---|
| Initial Context Setup Request | $K_{eNB}$ | The NH values for NCC = 1 and then for NCC = 2 are derived from $K_{eNB}$ and $K_{ASME}$ |
| UE Context Modification Request | $K_{eNB}$ (only when there is a new $K_{ASME}$) | |
| Handover Request | Security Context with NH/NCC | The NH/NCC values are needed for binding the Handover Request with the UE context information, including the $K_{ASME}$. After using one NH/NCC pair of values for monitoring an S1 handover, the NH is calculated in the vertical key derivation chain (NCC = 3, NCC = 4 . . . ). |

The NH parameter is a 32-byte value and should provide strong uniqueness across the MMEs for use as an index for the monitoring system. The chance of NH values colliding between two different UEs is very small. However, if two NH values do happen to collide it will result in incorrect correlation of the different handover call legs.

The MME 33 sends Handover Command message (304) to the source eNodeB 31 to inform it that the necessary resources for the handover have been prepared at the target side. The monitoring system captures message 304 on the S1-MME interface and using the S1AP identifiers associates it to the UE. Target eNodeB 32 sends Handover Notify message (305) when the UE attaches to the target eNodeB 32. The monitoring system captures message 305 on the S1-MME interface to the target eNodeB and using the S1AP identifiers associates it to the UE. After the handover is complete and target eNodeB has all the needed security information needed to decipher traffic from the Ue, the source eNodeB 31 and the MME 33 complete the UE context release procedures 306.

The monitoring system can use the "Target MME UE S1AP ID" and "Target eNB UE S1AP ID" parameters to identify the UE context that will be used between the target eNodeB and the MME. Referring to FIG. 4, a current security context on call leg 1 (407) includes source "eNB UE S1AP ID" (401) and "MME UE S1AP ID" (402) parameters associated with known security information such as a KASME (403), and derived KeNB (404), NCC (405) and NH (406) values. and call leg 2 (408) includes UE context information for a security context detected by the monitoring system. The "Target MME UE S1AP ID" (409) parameter is captured from Handover Request message 302. The NCC and NH values (410-411) are captured from the Security Context parameters in the Handover Request message 302. This information (409-411) applies to a current security context on call leg 2 (408). The Target eNB USE S1AP ID (412) data is captured from the Handover Request Ack message 303.

Because the NH key and NCC values for Leg 1 (407) and Leg 2 (408) do not match, the monitoring system knows that these legs do not apply to the same security context and, therefore, they likely do not correspond to the same UE. Accordingly, the monitoring system will not link Leg 1 (407) and Leg 2 (408). The monitoring system will capture additional UE context information from other Handover Required (301) messages, such as shown in Leg 3 (413). The NCC value and NH Key for Leg 3 (413) do not match the other entries in the UE context table 400, and so the monitoring system will not link the entries.

Eventually, the monitoring system will capture data for Leg 4 (414) from other Handover Request and Handover Request Ack messages. In the illustrated example, Leg 4 (414) includes NCC and NH key values that match the entry for Leg 1 (407). The monitoring system will recognize this match and will know to link the call records and security context information for Leg 1 (407) and Leg 4 (414). Further, the monitoring system now knows that $K_{ASME}$ (403) and derived $K_{eNB}$ (404) for Leg 1 (407) should be used to decipher traffic associated with Leg 4 (414). In this way, the monitoring system may use the NH key and NCC parameters to link different legs of a UE as it is handed-over among different eNodeBs.

In the situation of Inter-MME mobility—where the source and target eNodeBs are served by different MMEs—the monitoring system will still be able to captures the NH and NCC values if it is monitoring the S10 interface between the MMEs (FIG. 1) in addition to the S1-MME interface. The monitoring system may add entries to a UE context tracking table, such as table 400, for messages captured on the S10 interface in the same manner as used for messages captured from the S1-MME interface. However monitoring the S10 interface is not necessary if both the source and target eNodeBs are monitored by the same monitoring system.

In other embodiments of the invention, the monitoring system is also able to detect handovers that are coordinated between the source and target eNodeBs on the X2 interface in case of inter-eNodeB mobility. FIG. 5 illustrates the messages that are exchanged on the X2 and S1 interfaces for X2 handover.

The X2 handover procedure is used to switch the existing eUTRAN Radio Access Bearer (E-RAB) for the UE to a new, target eNodeB. This mobility scenario is referred to as "X2-based mobility" as the X2 interface is involved in establishing the handover. The source eNodeB 51 sends Handover Request message 501 to target eNodeB 52 over the X2 interface. Target eNodeB 52 acknowledges the handover request in Handover Request Ack message 502.

Target eNodeB 52 then sends a Path Switch Request message 503 to MME 53 with a listing of each E-RAB that needs to be switched to the target eNodeB 52. Path Switch Request message 503 includes the value of the "Source MME UE S1AP ID" used for the existing security context. MME 53 sends a Path Switch Request Acknowledge message 504 back to the target eNodeB 52. Upon receipt of message 504, the target eNodeB 52 has all the needed security information to continue deciphering traffic for the UE after the handover and it sends UE Context Release message 505 to the source eNodeB 51.

Path Switch Request Acknowledgement message 504 includes the parameters listed in Table 2.

TABLE 2

| MAJOR PARAMETERS | PURPOSE |
|---|---|
| eNB UE S1AP ID | Signaling connection identifier at the Target eNodeB side for the S1 signaling connection |
| MME UE S1AP ID | Signaling connection identifier at the MME side |
| Security Context | New fresh NH Key and NCC values |

The NH Key and NCC parameters in the Path Switch Request Acknowledgement message (504) can be used to link the new leg on the target eNodeB with the corresponding existing UE security context on the source eNodeB. The "eNB UE S1AP ID" and "MME UE S1AP ID" parameters in message 504 can be used to identify the messages on the new leg for the UE security context information.

The monitoring system applies a similar key tracking mechanism as used in the Intra-MME/S1-based handover described above. Prior to the handover, the monitoring system obtains the $K_{ASME}$ from AKA procedures and the $K_{eNB}$ from S1-AP Initial Context Setup request/S1-AP UE Context modification procedures. Once the $K_{eNB}$ is obtained, the monitoring system pre-computes the NH for NCC=2 and indexes all the Security Context information using the NH.

The NH key is obtained from S1-MME Path Switch Request Acknowledge message 504 and is used by the monitoring system to bind the source and the target S1-MME paths during the X2 handover. To handle handover chaining, the monitoring system pre-computes the next NH value corresponding to the next NCC and indexes the security context using this new NH value. When the target eNodeB 52 decides to handover to a new eNodeB, this new NH value will be used and detected by the monitoring system. The monitoring system will then be able to link the records for additional call legs using the NH value.

The monitoring system will take into account the EPS Mobility Management (EMM) and EPS Connection Management (ECM) states while monitoring the UE. There are two EMM states—EMM-Registered and EMM-Deregistered, and two ECM states—ECM-IDLE and ECM-Connected. EMM states describe the UE states that result from the mobility management procedures. ECM states describe if the UE is IDLE or CONNECTED. In the EMM-DEREGISTERED state, the EMM context in MME holds no valid location or routing information for the UE. The UE enters the EMM-REGISTERED state by a successful registration with an attach procedure to the eUTRAN. In the EMM-REGISTERED state, the UE can receive services that require registration in the EPS. In the EMM-REGISTERED state, the UE has at least one active PDN connection and setup the EPS security context.

A UE is in ECM-IDLE state when there is no NAS signaling connection between UE and the network. There is no UE context in the eUTRAN for the UE in the ECM-IDLE state, so there is no S1-MME connection for this UE. In the ECM-CONNECTED state, the UE location is known in the MME with an accuracy of a serving eNodeB. For a UE in the ECM-CONNECTED state, a signaling connection exists between the UE and the MME. The signaling connection referred here is made up of two parts: the RRC connection and the S1-MME connection.

The monitoring system takes the following actions when the UE transitions to the various states.

Transition TO EMM-DEREGISTERED STATE

The EPS NAS Detach procedure causes this transition. The mapped security contexts are deleted and NH/NCC are deleted as well.

Transition from ECM-CONNECTED to ECM-IDLE

The NH/NCC is deleted. When there is the transition back from ECM-IDLE to ECM-CONNECTED then there is a new initial $K_{eNb}$ generated.

Transition from ECM-IDLE to ECM-CONNECTED

The UE shall use the native EPS NAS security context stored on the USIM. The eKSI index corresponding to this native security context shall be monitored by the network monitoring system in the S1-AP Initial UE message. If that context was not the "current" context, the MME shall trigger a NAS SMC procedure to make it current. Or the MME might decide to perform a new NAS AKA and NAS SMC procedure to change it.

In the S1-based Handover inter-MME scenario, when the source MME has successfully performed a NAS Security Mode Command (SMC) procedure (taking a new $K_{ASME}$ into use), but has not yet successfully performed a UE Context Modification procedure (which takes a $K_{eNb}$ derived from the new $K_{ASME}$ into use), the MME includes both the old $K_{ASME}$ with the corresponding eKSI, NH, and NCC, and a full EPS NAS security context based on the new $K_{ASME}$ in the S10 FORWARD RELOCATION message. So the network monitoring system on the source side has to derive a new NH value based on the new $K_{eNb}$ in the UE Context Modification procedure, and the old NH key is deleted. On the S10 Forward Relocation message, if the OSCI bit in the UE MM context is set, the old NH is used to bind to source S1 side. The new $K_{ASME}$ and eKSI are stored as a new EPS security context and will be used decipher the NAS payload.

In the above scenario, there will be a UE Context Modification procedure on the target side which carries an initial $K_{eNB}$. This together with new $K_{ASME}$ derives the NH for NCC=1. Then NH for NCC=2 is derived, and the old NH is deleted.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for monitoring a Long Term Evolution (LTE) mobile telecommunications network during user equipment mobility, the LTE mobile telecommunications network having User Equipment in radio communication with an Evolved Packet Core (EPC) having a first mobility management entity (MME) in communication with a Home Subscriber Service (HSS) by a S6a interface, the EPC interfacing with an evolved Universal Mobile Telecommunications System Terrestrial Radio Access Network (E-UTRAN) having a plurality of enhanced NodeBs interconnected by X2 interfaces and a Serving GPRS Support Node (SGSN) communicating with the MME via a S3 interface, and the EPC having a second MME communicating with the first MME via a S10 interface, the method comprising the steps of:

providing a network monitoring system for capturing and analyzing Packet Data Units (PDUs) from a subset of network interfaces in the LTE mobile telecommunications network;

identifying, at the network monitoring system, first context data associated with a first user on S1-MME interfaces between the MMEs and a first enhanced NodeB in the E-UTRAN and S6a interfaces between the MMEs and the HSS, wherein the network monitoring system is connected to the S1-MME interfaces, the S6a interfaces, the S10 interface, the S3 interface, and the X2 interface;

identifying a source identifier, a destination identifier, a Key Access Security Management Entries ($K_{ASME}$) key and an enhanced NodeB ($K_{eNB}$) key for the first user from the first context data;

deriving, at the network monitoring system, one or more next hop parameters for first user equipment from the $K_{ASME}$ and $K_{eNB}$ keys; and creating a first context entry for the first user in a table, the first context entry comprising the source identifier, destination identifier, $K_{ASME}$ key, $K_{eNB}$ key, and the one or more next hop parameters for the first user so that the network monitoring system tracks and correlates the $K_{ASME}$ and $K_{eNB}$ keys during handover from one of the eNBs to another of the eNBs by the network monitoring system only monitoring the S1-MME interfaces and the S6a interfaces, wherein the tracking and correlation allows deciphering traffic after handoff.

2. The method of claim 1, further comprising:
identifying, at the network monitoring system, second context data associated with a second user on a second interface between the MMEs and a second enhanced NodeB;
identifying one or more next hop parameters for the second context data;
comparing the one or more next hop parameters to entries in the table;
determining that the one or more next hop parameters for the second context data match the next hop parameters for the first context data;
determining that the first context data and the second context data correspond to the same user equipment; and
combining the second context data with the first context data.

3. The method of claim 1, wherein the one or more next hop parameter comprise a Next Hop (NH) Key or a Next Hop Chaining Counter (NCC) or both.

4. The method of claim 1, wherein the $K_{ASME}$ and $K_{eNB}$ keys for the first user are generated using an authentication and key agreement procedure.

5. The method of claim 1, further comprising:
deriving, at the network monitoring system, one or more next hop parameters for the first user equipment from the $K_{ASME}$ and $K_{eNB}$ keys; and
creating a first context entry for the first user in a table, the first context entry comprising the source identifier, destination identifier, $K_{ASME}$, $K_{eNB}$, and
the one or more next hop parameters for the first user.

6. The method of claim 2, wherein the one or more next hop parameters for the second context data are captured by the monitoring system from a Handover Request message on the second interface.

7. The method of claim 2, wherein the source identifier and destination identifier associated with the second context data are captured from a Handover Request message on the second interface, or a Handover Request Acknowledgement message on the second interface, or from both messages.

8. The method of claim 2, wherein the second interface is an S1-MME interface.

9. The method of claim 2, wherein the second interface is an S10 interface.

10. The method of claim 2, wherein the second interface is an S1-MME interface, and wherein the one or more next hop parameters for the second context data are captured by the monitoring system from a Path Switch Request Acknowledge message.

11. The method of claim 1, further comprising:
pre-computing, in the monitoring system, a subsequent next hop parameter; and
appending the subsequent next hop parameter to the first context data.

12. A network monitoring system for correlating security keys during user equipment mobility in a Long Term Evolution (LTE) network having mobility management entities (MMEs) interconnected by S10 interfaces, a Home Subscriber Service communicating with at least one of the MMEs by a S6a interface, a Serving GPRS Support Node (SGSN) communicating with at least one of the MMEs by a S3 interface, and a plurality of enhanced NodeBs interconnected by X2 interfaces and communicating with the MMEs by S1-MME interfaces, the network monitoring system comprising:
one or more passive monitoring probes coupled to the S1-MME interfaces, the S6a interfaces, the S10 interface, the S3 interface, and the X2 interface, the passive monitoring probes capable of capturing data packets from the network interfaces; and
a processor receiving the captured data packets from the passive monitoring probes by monitoring only the S1-MME interfaces and the S10 interfaces, the processor operating to:
identify first context data associated with a first user on a first S1-MME interface between a mobility management entity and a first enhanced NodeB;
identify $K_{ASME}$ and $K_{eNB}$ keys for the first user from the first context data;
derive one or more next hop parameters for the first user equipment from the $K_{ASME}$ and $K_{eNB}$ keys;
create a first context entry for the first user in a table, the first context entry comprising the $K_{ASME}$ key, $K_{eNB}$ key, and the one or more next hop parameters for the first user;
identify second context data associated with a second user on a second S1-MME interface between the mobility management entity and a second enhanced NodeB;
identify one or more next hop parameters for the second context data; and
compare the one or more next hop parameters to entries in the table.

13. The monitoring system of claim 12, wherein the processor is further operable to determine that the one or more next hop parameters for the second context data match the next hop parameters for the first context data;
determine that the first context data and the second context data correspond to the same user equipment; and
combine the second context data with the first context data.

14. The monitoring system of claim 12, wherein the processor is further operable to:
determine that the one or more next hop parameters for the second context data do not match the next hop parameters for the first context data;
determine that the first context data and the second context data correspond to different user equipment; and create a second context entry for the second user in the table, the second context entry comprising the one or more next hop parameters for the second user.

15. A computer-readable storage medium comprising instructions for controlling a monitoring system to analyze data packets captured from network interfaces to correlate security keys during user equipment mobility in a Long Term Evolution (LTE) network having mobility management entities (MMEs) interconnected by S10 interfaces, a Home Subscriber Service communicating with at least one of the MMEs by a S6a interface, a Serving GPRS Support Node (SGSN) communicating with at least one of the MMEs by a S3 interface, and a plurality of enhanced NodeBs interconnected by X2 interfaces and communicating with the MMEs by S1-MME interfaces, the network monitoring system, wherein the instructions, when executed, cause a processor to perform actions comprising:

identify first context data associated with a first user on a first interface between a mobility management entity and a first enhanced NodeB;

identify $K_{ASME}$ and $K_{eNB}$ keys for the first user from the first context data;

derive one or more next hop parameters for the first user equipment from the $K_{ASME}$ and $K_{eNB}$ keys;

create a first context entry for the first user in a table, the first context entry comprising the $K_{ASME}$ key, $K_{eNB}$ key, and the one or more next hop parameters for the first user;

identify second context data associated with a second user on a second interface between the mobility management entity and a second enhanced NodeB;

identify one or more next hop parameters for the second context data; and compare the one or more next hop parameters to entries in the table, wherein the data packets are captured from the passive monitoring probes by the monitoring system monitoring only the S1-MME interfaces and the S10 interfaces.

16. A network monitoring system in communication with a Long Term Evolution (LTE) mobile telecommunications network having User Equipment in radio communication with an Evolved Packet Core having a mobility management entity (MME) in communication with a Home Subscriber Service (HSS), the EPC interfacing with an evolved Universal Mobile Telecommunications System Terrestrial Radio Access Network (E-UTRAN) having a plurality of base stations (eNBs), the network monitoring system comprising:

(a) a memory storing an instruction set and data; and (b) a processor for running the instruction set, the processor being in communication with the memory, wherein the processor is operative to:

(i) capture and analyze Packet Data Units (PDUs) from only network interfaces between the MME and eNBs as well as the MME and the HSS in the LTE mobile telecommunications network;

(ii) identify first context data associated with a first user on a first interface between the MME and a first enhanced NodeB in the E-UTRAN;

(iii) identify a source identifier, a destination identifier, a Key Access Security Management Entries ($K_{ASME}$) key and a eNB ($K_{eNB}$) key for the first user from the first context data;

(iv) derive one or more next hop parameters for first user equipment from the $K_{ASME}$ and $K_{eNB}$ keys; and (v) create a first context entry for the first user in a table, the first context entry comprising the source identifier, destination identifier, $K_{ASME}$ key, $K_{eNB}$ key, and the one or more next hop parameters for the first user so that the network monitoring system tracks the $K_{ASME}$ and $K_{eNB}$ keys during handover from one of the eNBs to another of the eNBs to decipher traffic after the handover.

17. A network monitoring system as recited in claim 16, wherein the processor is further operative to calculate a Next Hop Chaining Counter (NCC) and a Next Hop (NH) Key.

18. A network monitoring system as recited in claim 16, further comprising a plurality of probes coupled to the interfaces to capture the PDUs.

19. A network monitoring system as recited in claim 16, wherein the processor is further operative to process the data based on the PDU analysis, provide measurements of performance based on the data, and create reports based on the performance for troubleshooting and optimization purposes.

20. A network monitoring system as recited in claim 16, wherein the processor and memory are resident on the MME.

* * * * *